Feb. 18, 1936.  J. S. KIESEL  2,031,372
GATE VALVE
Filed Sept. 18, 1934  2 Sheets-Sheet 1
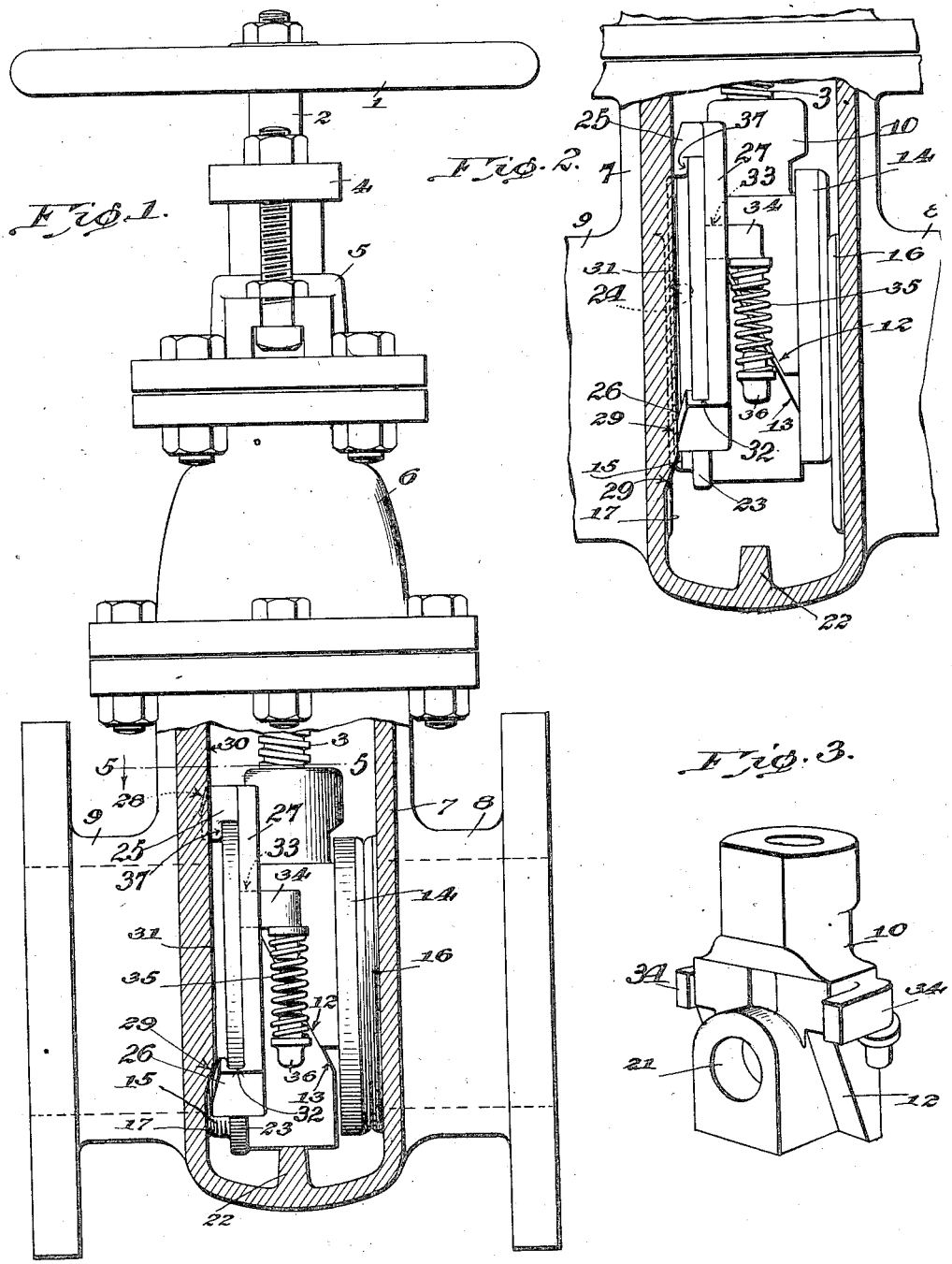
INVENTOR
John S. Kiesel,
BY
ATTORNEYS Feb. 18, 1936.   J. S. KIESEL   2,031,372
GATE VALVE
Filed Sept. 18, 1934   2 Sheets-Sheet 2
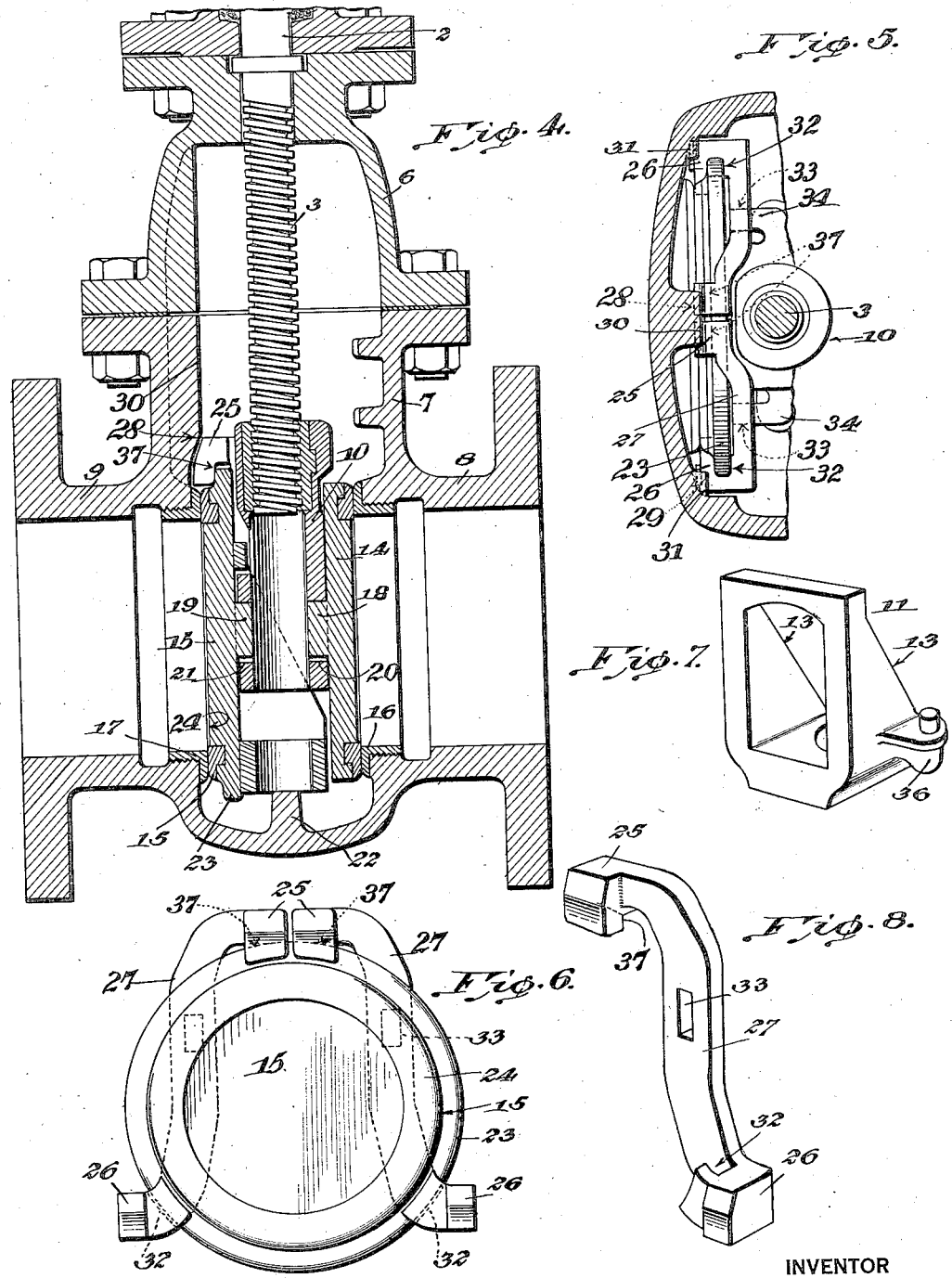
INVENTOR
John S. Kiesel,
BY
Munn, Anderson & Liddy
ATTORNEYS Patented Feb. 18, 1936

2,031,372

UNITED STATES PATENT OFFICE 2,031,372

GATE VALVE

John S. Kiesel, Williamsport, Pa.

Application September 18, 1934, Serial No. 744,568

10 Claims. (Cl. 251—71)

This invention relates to improvements in gate valves, and its objects are as follows:—

First, to provide positively operated means (in this case a pair of retainers) for pulling at least one of the valve discs (the one on the downstream side) from its seat as it is raised in opening the valve but without materially impairing its turning moment.

Second, to operate the foregoing retainers by making them move up ramps onto tracks, the cam action positively pulling the respective disc away from its seat in such a manner as to maintain the axis of the disc parallel to the fluid opening axis, the riding of the tracks by the retainers keeping the disc clear of the seat and valve body.

Third, to provide the retainers with wear heads to directly engage the ramps and tracks so as to concentrate the wear on bearing surfaces which are provided for this purpose and which are not responsible for the pressure tightness of the valve when closed.

Fourth, to prevent marring the face of the foregoing disc by providing it with a peripheral flange from which the face is offset, the retainers holding the flange loosely yet firmly for the purposes stated.

Fifth, to provide springs to collapse the wedges and insure their release before the retainers start to move up the ramps to the tracks, the spring-release being of special value when the gate valve is installed in a horizontal or upside-down position in a pipe line.

In the drawings:—

Figure 1 is a vertical section of the improved gate valve, parts being in elevation, the gates or valve discs being in their closed positions.

Figure 2 is a fractional view of the valve in its initially open position, particularly illustrating how the retainers pull the downstream disc from its seat ring when moving up the ramps onto the tracks.

Figure 3 is a detail perspective view of the upper wedge.

Figure 4 is a sectional vertical section of the valve.

Figure 5 is a detail horizontal section taken on the line 5—5 of Figure 1.

Figure 6 is a front elevation of the downstream disc and its retainers.

Figure 7 is a detail perspective view of the lower wedge.

Figure 8 is a detail perspective view of one of the retainers.

The gate valve is of the double disc, parallel seat, non-rising or rising stem type and generally works on the principle of the valve disclosed in the patent to Henry Millholland No. 808,561 of December 26, 1905. That much of the structure which is common to the patent and the instant valve, this being a valve of the non-rising stem type, is briefly described as follows:—

The handwheel 1 is secured to the upper end of the stem 2. The lower end of this stem is threaded at 3, and inasmuch as the threaded end is screwed into the movable valve assemblage on the interior, it follows that turning of the handwheel raises and lowers the assemblage according to the direction of turning.

The stem 2 goes through the gland 4 and a stuffing box 5 which is fastened to the upper end of the bonnet 6. The bonnet, in turn, is secured to the valve body or case 7. This has fluid openings consisting of an inlet 8 and an outlet 9, the latter being directed to the downstream side and being that part of the valve with which the improvement to the foregoing valve assemblage is related.

Upper and lower wedges 10, 11 which have wedge faces 12, 13, are so interengaged that when the handwheel 1 is turned in the proper directions the wedging pressure on the backs of the discs 14, 15, respectively on the up and downstream sides, will be applied and/or released, thereby assisting in seating or unseating the discs 14, 15 on the seat rings 16, 17, while corresponding lowering or raising of the assemblage goes on. The upper wedge 10 constitutes part of the raising and lowering means 2, 3.

The discs 14, 15 have trunnions 18, 19 on back, to loosely fit in the sockets 20, 21 in the upper wedge 10. This provision makes it possible for the discs to turn, thereby tending to wear evenly as they engage their seat rings 16, 17, and also to have a lapping action on the seat rings which aids in maintaining the pressure tightness of the valve. A boss 22 in the bottom of the body or case 7 stops the downward travel of the lower wedge.

From this point all the description is concerned with the improvement which, as briefly brought out in the statement of the invention, makes it possible to pull the downstream disc 15 away from its seat ring 17 by a positively operated means which will not be interfered with by the fluid pressure on the outlet side and so obviate the tendency of that disc to drag on its seat ring by virtue of the pressure behind it, and so reduce the tendency to wear. The disc 15 has a peripheral flange 23 (Figs. 1 and 6). This flange is set back from the face 24 of the disc or, what is the same thing, the face is offset from the flange, the purpose being to provide ample room for the corresponding wear heads 25, 26 of retainers 27.

These retainers herein known as the positively operated means for pulling the disc 15 from its seat ring, are made in right and left form (Fig. 6). There is a pair of these retainers as plainly shown, and when the corresponding heads 25, 26 are assembled on the peripheral flange 23 they take the embracing position clearly shown in Figure 6. The heads are on one side of the disc and the shanks of the retainers on the other. The contact faces of the wear heads are in a plane slightly ahead (Figs. 2 and 4) of the face 24 of the disc 15. The wear heads thus face the outlet 9 or downstream side of the valve, and when these heads are made to move up the ramps 28, 29 (Figs. 1 and 2) of tracks 30, 31, the resulting cam action causes the retainers to positively pull the disc 15 away from its seat ring 17 at the same time maintaining the axis of the disc parallel to the fluid opening axis without regard to the fluid pressure behind the valve disc.

There are three of these tracks, so spaced as to be uniformly situated with respect to the disc 15; the track 30 (Fig. 5) is single and is centrally situated so that both heads 25, being close together, can ride thereon in common. There is a pair of tracks 31. These are parallel to the track 30 but are spaced apart so as to be in line with the rather widely spaced retainer heads 26. The retainers, being separate from the disc, can be replaced without the necessity for replacing the disc, if the heads 25 and 26 should become worn to the extent that would make this necessary.

The heads 25, 26 of the retainers 27 are notched or slotted at 37, 32 (Figs. 6 and 8) to take the flange 23 (Fig. 6). The disc is held firmly yet loosely in these slots or notches, to permit its movement back and forth with respect to the seat ring, yet allowing it to rotate. The heads 25, 26 are so shaped that they extend beyond the disc face 24 (as already indicated previously) to protect the disc face during the upward and downward travel.

Slots 33 in the shanks 27 of the retainers complete the mounting of the retainers on the upper wedge 10 when the lugs 34 of the latter are fitted in as shown in Figure 1. This mounting is loose, there being the necessity of bodily inward and outward movements of the retainers on the lugs with respect to the upper wedge as the retainers ride the ramps and tracks. The retainers constitute an additional device which connects the disc 15 to the disc-raising means 2, 3, 10, and this connection is loose, as already brought out, by reason of the loose engagement of the lugs 34 in the slots 33.

Springs 35 expand against the lugs 34 on the upper wedge 10 and against lugs 36 on the lower wedge 11 and so separate the wedges when permitted to insure the release of the wedge pressure from the discs 14, 15 before the retainers 27 start to move up the ramps 28, 29. Ordinarily reliance can be put on the action of gravity on the lower wedge 11 for the foregoing wedge release when the gate valve is connected in a vertical position (or substantially so), in a pipe line as in Figure 1. But in many instances the gate valve is to be installed in horizontal or upside down positions, and it is then that the springs 35 are desirable to insure of complete release of the wedges.

The operation is readily understood. Upon turning the handwheel the screwing of the threaded part 3 of the stem into the upper wedge 10 will raise the upper wedge. A fraction of the first turn will permit the springs 35 to separate the upper and lower wedges 10, 11 and so relieve the outward wedging pressure on the backs of the discs 14, 15.

The first turn or so of the handwheel will engage the wear heads 25, 26 with the ramps 28, 29 and thereby start to drive the retainers 27 backwardly or inwardly (toward the screw 3) almost as soon as turning commences. The resulting cam action, as already pointed out, positively pulls the disc 15 away from its seat ring 17, so that regardless of how heavy the fluid pressure (within limits) may be behind the disc 15 it will be positively pulled away from its seat ring so that its face 24 will not be marred by dragging over the seat ring during the upward travel of the valve assemblage. The disc is also prevented from chattering on its seat and so becoming marred when the valve is used for throttling with the gate in a partly opened position.

As soon as the wear heads reach the tracks 30, 31, (Fig. 2) which will be almost immediately after the initial opening action, the disc 15 will be kept clear of its seat ring 17 and case 7. Upon reversely turning the handwheel 1 the reverse procedure occurs with respect to the valve assemblage. The upper wedge 10 will be moved downwardly, and the lower wedge 11 with it, the two wedges still being held separated a limited amount by the springs 35.

During the closing movement the discs, especially the disc 15, descend free and clear of the respective seats until the lower wedge 11 strikes the boss 22. At that time the discs will be in front of their seats, and further downward movement of the upper wedge will force the two discs squarely against their seat rings 16, 17. The disc 15 carries the retainers 27 with it, the heads 25, 26 then being opposite to the ramps 28, 29.

I claim:—

1. A gate valve casing having a fluid opening with a seat ring, a valve disc and raising means by which to raise the disc from a closed position against the ring, and means carried by the raising means and in turn carrying the valve disc positively operating directly against means on the casing for first pulling the disc away from the seat ring.

2. A gate valve case having a fluid opening with a seat ring, a valve disc and raising means by which to raise the disc from a closed position against the ring, means loosely carried by the raising means and in turn carrying the valve disc at peripherally spaced points, and means on the case against which the loosely carried means operates directly for pulling the disc away from the seat ring preparatory to said raising.

3. A gate valve casing having a fluid opening with a seat ring, a valve disc and means by which to raise the disc from a closed position against the ring, means loosely carried by the raising means and loosely embracing the periphery of the valve disc at spaced points so as to support the valve disc, and means on the casing against which the loosely carried means is operable with a cam action which is initiated by the disc-raising means to first pull the disc away from the seat ring.

4. A gate valve case having a fluid opening with a seat ring, a valve disc and means by which to raise the disc from a closed position against the ring, a central track on the case starting adjacently to the top of said disc and lateral tracks also on the case starting adjacently to the bottom of said disc, each starting end having a ramp, a device loosely connecting the disc to the disc-raising means, and bearing heads so fixed on the device as to confront the various ramps, said heads simultaneously riding up the ramps onto the tracks to pull the disc away from the seat ring with an evenly distributed lateral pull in the initial operation of the raising means.

5. A gate valve case having a fluid opening with a seat ring, a valve disc and means by which to raise the disc from a closed position against the ring, a pair of retainers, means included in the retainers loosely engaging parts of the disc, said means including wear heads, means carried by the disc-raising means on which the retainers are loosely mounted so as to be capable of back and forth movement with respect to the ring, and cam means on the case onto which the wear heads ride in the initial opening movement of the disc by the raising means, causing a back movement of the disc and a pulling away thereof from said ring.

6. A gate valve case having a fluid opening with a seat ring, a valve disc having a peripheral flange from which the face of the valve disc is offset, a pair of retainers comprising shanks having wear heads closely embracing the flange at points and standing out in relief from the face, tracks on the case in line with the wear heads, each track having a ramp confronted by the heads when the disc is closed against the ring, disc-raising means to raise the disc from the closed position, and means providing a loose mounting for the retainer shanks on the disc-raising means carrying the retainers with the latter and causing the retainers to pull the disc from the ring by the cam action of the wear heads and ramps.

7. In a gate valve having a case with an inlet and an outlet respectively on the upstream and downstream sides and a seat ring at the inlet and outlet, a pair of valve discs and disc-raising means including upper and lower co-acting wedges on which the discs are turnably mounted; retaining means loosely but positively holding the downstream disc, means on the upper wedge upon which the retaining means is loosely mounted, and means on the case with which the retaining means coacts to positively pull the downstream disc away from its seat ring while the upstream disc is released from its seat ring by the parting of the wedges in the initial operation of the raising means.

8. In a gate valve having a case with an inlet and an outlet respectively on the upstream and downstream sides and a seat ring at the inlet and outlet, a pair of valve discs and disc-raising means including upper and lower co-acting wedges on which the discs are turnably mounted; retaining means loosely but positively holding the downstream disc, means on the upper wedge upon which the retaining means is loosely mounted, means on the case with which the retaining means coacts to positively pull the downstream disc away from its seat ring while the upstream disc is released from its seat ring by the parting of the wedges in the initial operation of the raising means, and springs fixed between the upper and lower wedges to insure the parting of the wedges in said initial operation.

9. A gate valve case having a fluid opening with a seat ring, a valve disc and raising means for the disc, a bearing structure on which the disc can turn with respect to the raising means, and separate means respectively carried by the case and by the valve disc mutually coacting to displace the disc from the seat ring and at the same time maintain the axis of the disc parallel to the fluid opening axis.

10. In a gate valve assemblage, a pair of discs, upper and lower wedges of which the upper wedge constitutes a part of raising and lowering means for the assemblage, retainer means by which one of the discs is embraced, springs by which to cause a forcible separation of the wedges in the initial raising act of said raising and lowering means, lugs on one of the wedges serving the double purpose of mountings for the retainer means and abutments for one end of the springs, and confronting lugs on the other wedge abutted by the other ends of the springs.

JOHN S. KIESEL.